United States Patent
Malakiman

(10) Patent No.: US 6,626,631 B1
(45) Date of Patent: Sep. 30, 2003

(54) PAPER TURNER FOR WORK AND TURN PRINTING OPERATION

(76) Inventor: Shawn Malakiman, 2158 Paseo Del Oro, San Jose, CA (US) 95124

( * ) Notice: Subject to any disclaimer, the term of this patent is extended or adjusted under 35 U.S.C. 154(b) by 0 days.

(21) Appl. No.: 10/027,550

(22) Filed: Dec. 20, 2001

(51) Int. Cl.$^7$ ................................................ B62B 1/12
(52) U.S. Cl. .................... 414/773; 280/47.29; 414/778; 414/907
(58) Field of Search ................................ 414/788, 773, 414/778, 783, 907; 280/47.27, 47.28, 47.29, 79.3

(56) References Cited

U.S. PATENT DOCUMENTS

| | | | | | |
|---|---|---|---|---|---|
| 3,314,554 A | * | 4/1967 | Cuniberti | .................... | 414/739 |
| 3,946,880 A | * | 3/1976 | Schmitt | .................... | 414/795.9 |
| 5,178,506 A | * | 1/1993 | Meschi | .................... | 414/268 |
| 5,295,309 A | * | 3/1994 | Kozlowski et al. | ........... | 34/444 |
| 5,312,222 A | * | 5/1994 | Neri et al. | .................... | 414/788 |
| 5,354,170 A | * | 10/1994 | Schweingruber et al. | ... | 414/790 |
| 5,358,372 A | * | 10/1994 | Meredith | .................... | 414/778 |
| 5,743,374 A | * | 4/1998 | Monsees | .................... | 198/403 |

* cited by examiner

*Primary Examiner*—Janice L. Krizek
(74) *Attorney, Agent, or Firm*—The Kline Law Firm

(57) ABSTRACT

A load turning device specifically designed to turn paper in a work and turn printing process includes a pair of slides mounted on a pair of parallel tracks. To turn the paper stack, the paper turner is positioned so that a first slide is under the pallet on which the paper stack rests. The second slide is lowered to rest on top of the paper stack, and the slides are locked in position relative to each other. The paper turner is then turned, using wheels to support the weight, until the stack is in a horizontal position. The slides and the paper stack are then moved to the opposite end of the tracks. The paper turner is again rotated until it is in a vertical orientation, rotated 180° from its original position. The printed sides of the paper are now facing downward, and the paper is ready to be loaded into the printing press.

7 Claims, 8 Drawing Sheets

PAPER TURNER FOR WORK AND TURN PRINTING OPERATION

BACKGROUND OF THE INVENTION

1. Field of the Invention

The present invention relates generally to equipment used in the printing industry, and more particularly is a paper turner for a work and turn operation.

2. Description of the Prior Art

The printing industry requires a good deal of high cost capital equipment. Much of the cost of a given printing job is due to the expense of the printing presses. A simple, low end press costs $100,000, and a high end, multi-color press costs millions of dollars. Multi-color presses typically require more than one press operator—a head press man and at least one press helper. The head press man sets up the color and the registration, and the press helper feeds the paper. If a particular shop cannot afford the expense of the press helper, then the head press man does both the set up work and the paper feeding. This situation significantly slows the pace of production.

Printing presses are also distinguished by whether they print on only one side of the paper on a given run (a straight press), or whether they print on both sides of the paper simultaneously (a perfecting press). The distribution of these machines in the printing industry is roughly 90%/10%, with the straight presses being the far more common machine. This means that the majority of printing work is done on a straight press, printing on one side at a time, even though most printing jobs require printing on two sides.

Therefore, most of the time a "work and turn" operation is required. That is, the first side is printed, then the paper is flipped over, and the second side is printed by running the paper through the same press a second time. The turning operation is generally accomplished manually, by either the head press man or the press helper. The turner must take the stack of paper printed on one side back to the feeding area at the rear of the press, turn the paper, usually in stacks of two to three inches, and feed the paper back into the press. This is clearly a time consuming operation, and if there is only, a single press operator, the operator has to monitor the colors and the registration-while feeding the press. This arrangement slows the operation and can adversely affect the print quality.

The prior art automation solution for the work and turn operation is a hydraulic turning machine. This current art machine clamps the paper to be turned tightly on both the top and bottom of the paper, lifts the paper, and turns it. This is a costly solution to the work and turn problem, in that the automatic turning machines cost from $17,000 to $30,000. Moreover, the automatic turning machines can create yet another problem. The pressure used by the machines to secure the paper can offset the print if the printed material is not allowed to dry before the turning operation. If you turn the printed paper too soon, the work is destroyed. If you wait for the ink to dry, delay is introduced into the printing process.

Accordingly, it is an object of the present invention to provide a method of automating the work and turn operation.

It is a further object of the present invention to provide a turning mechanism that allows the turn operation to be completed immediately after the first printing run without a likelihood of offsetting print, even though the paper is turned before it has dried.

It is a still further object of the present invention to provide a turning machine that is relatively inexpensive, and that is easy to use.

SUMMARY OF THE INVENTION

The present invention is a load turning device specifically designed to turn paper in a work and turn printing process. The paper turner comprises a pair of slides mounted on a pair of parallel tracks supported by bracing elements. To turn the paper stack, the paper turner is positioned so that a first slide is under the pallet on which the paper stack rests. The second slide is lowered to rest on top of the paper stack, and the slides are locked in position relative to each other.

The paper turner is then turned, using wheels and pivot rests affixed to the frame to support the weight, until the stack is in a horizontal position. The slides and the paper stack are then moved to the opposite end of the tracks. The frame is again rotated until it is in a vertical orientation, rotated 180° from its original position. The printed sides of the paper are now facing downward, and the paper is ready to be loaded into the printing press.

An advantage of the present invention is that it allows a single operator to efficiently perform a work and turn operation.

Another advantage of the present invention is that it does not require heavy pressure on the freshly printed paper, so that the print quality is not jeopardized.

A still further advantage of the present invention is that it greatly reduces the time required for a double-sided printing job on a straight press.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
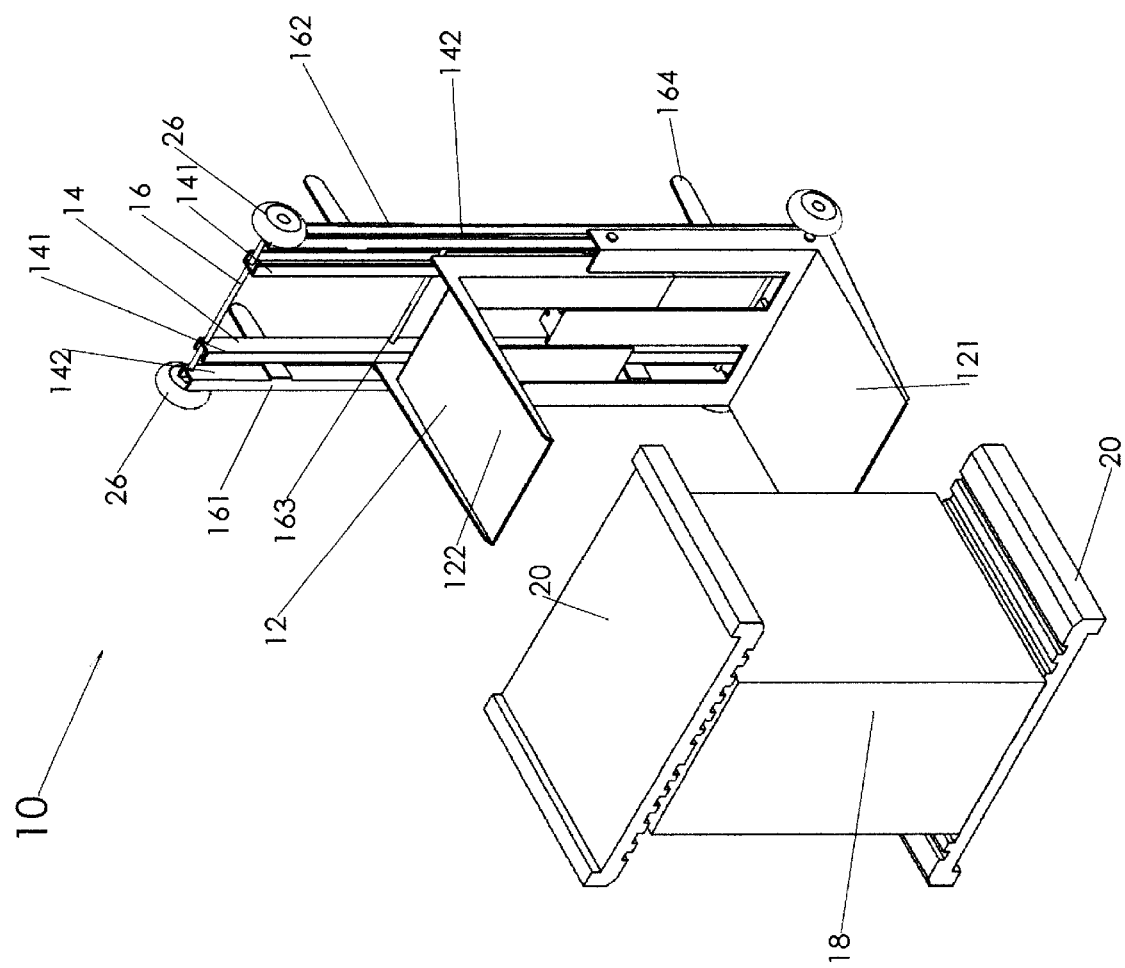
FIG. 1 is a perspective view of the paper turner of the present invention before a paper stack is loaded.

The present invention is a load turning device specifically designed to turn paper in a work and turn printing process. The paper turner 10 comprises a slide module 12 mounted on a pair of parallel tracks 14. The slide module 12 is installed on the parallel tracks 14 so that the slide module 12 can move along the tracks 14. The tracks 14 are supported by bracing elements 163. The paper turner 10 is specifically adapted to turn a paper stack 18 sandwiched between a pair of pallets 20.

Figure 7:
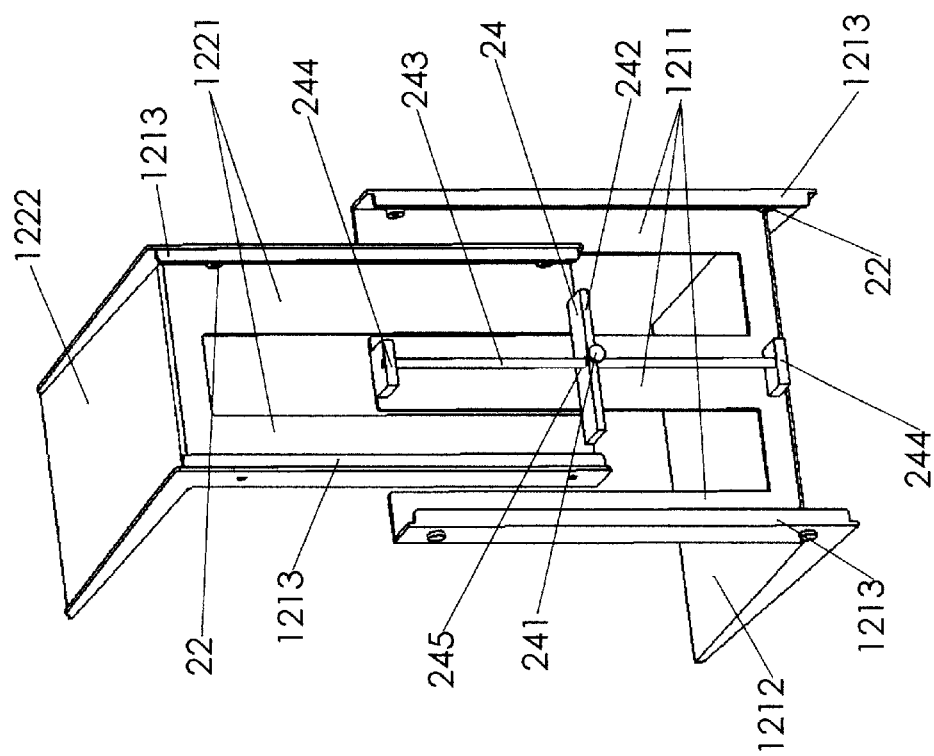
FIG. 7 is a rear perspective view of the slide assembly.

The slide module 12, shown in greater detail in FIG. 7, comprises a first slide 121 and a second slide 122. It should be noted preliminarily that any construction of the slide module 12 that would allow linear movement of the first slide 121 relative to the second slide 122 will suffice. In the preferred embodiment, the first slide 121 comprises three mounting bars 1211. A first clamping plate 1212 is affixed at a distal end of the mounting bars 1211 and extends at an approximately 90° angle outward from the mounting bars 1211. The second slide 122 comprises a pair of mounting bars 1221 that nest within the mounting bars 1211 of the first slide 121. A second clamping plate 1222 is affixed at a distal end of the mounting bars 1221 and extends at an approximately 90° angle outward from the mounting bars 1221. The mounting bars 1211, 1221 include protrusions 1213 that engage the tracks 14.

The tracks 14 each comprise an inner rail 141 and an outer rail 142. The inner rails 141 engage the protrusions 1213 of the second slide 122, and the outer rails 142 engage the protrusions 1213 of the first slide 121. Bearings 22 facilitate the travel of the slides 121, 122 along the rails 141, 142.

The relative spacing of the second slide 122 from the first slide 121 is controlled by a spacing mechanism 24. The spacing mechanism 24 comprises a lock screw 241 that is mounted in a guide plate 242 affixed to the second slide 122. The spacing mechanism 24 also comprises a guide rod 243 affixed to the center mounting bar 1211 of the first slide 121 by means of mounting blocks 244. The guide rod 243 passes through a through hole 245 in the guide plate 242. When the lock screw 241 is loosened, guide rod 243 passes freely through guide plate 242, and the second slide 122 moves freely relative to the first slide 121. Conversely, when the lock screw 241 is tightened, the position of the second slide 122 relative to the first slide 121 is fixed.

In the preferred embodiment, the frame 16 comprises the rails 14, the bracing elements 163, and the pivot rests 164. The pivot rests 164 serve as primary fulcrum points when the paper turner 10 is being rotated. A first set of wheels 26 is mounted at a top end of the rails 14, and a second set of wheels 26 is mounted at a bottom end of the rails 14. The wheels 26 make the paper turner 10 easy to move, and provide convenient balance and secondary fulcrum points when the turner 10 is being rotated.

Figure 2:
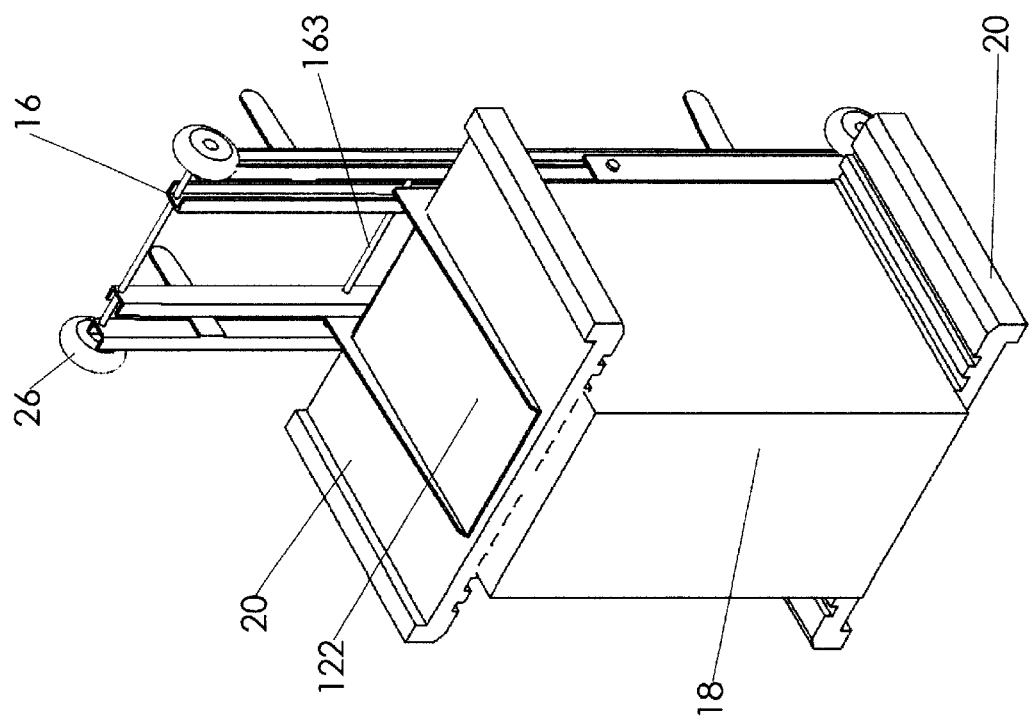
FIG. 2 is a perspective view of the paper turner after the paper stack is loaded.

Operation of the paper turner 10 of the present invention in a work and turn printing operation is as follows:

Referring first to FIG. 1, the turning operation is initiated with a paper stack 18 placed on a first pallet 20. A second pallet 20 is placed upside down on top of the paper stack 18. The lock screw 241 is loosened and the second slide 122 is raised to a height sufficient to clear the top of the paper stack 18. The paper turner 10 is then moved forward so that the first slide 121 is positioned under the first pallet 20. The lock screw 241 is loosened, and the second slide 122 is lowered so that it contacts the top of the paper stack 18, securing the paper stack 18 in the slide module 12, as is illustrated in FIG. 2.

Figure 3:
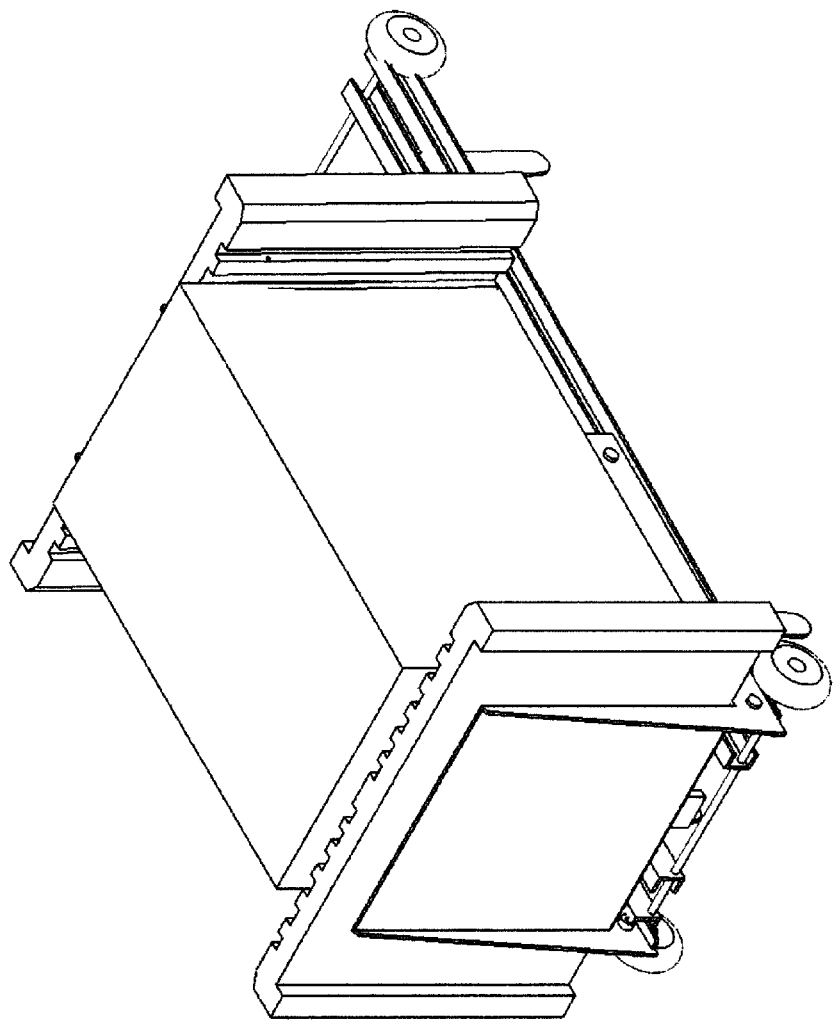
FIG. 3 is a perspective view showing the paper turner after the turner and the paper stack have been rotated to a horizontal position.
Figure 4:
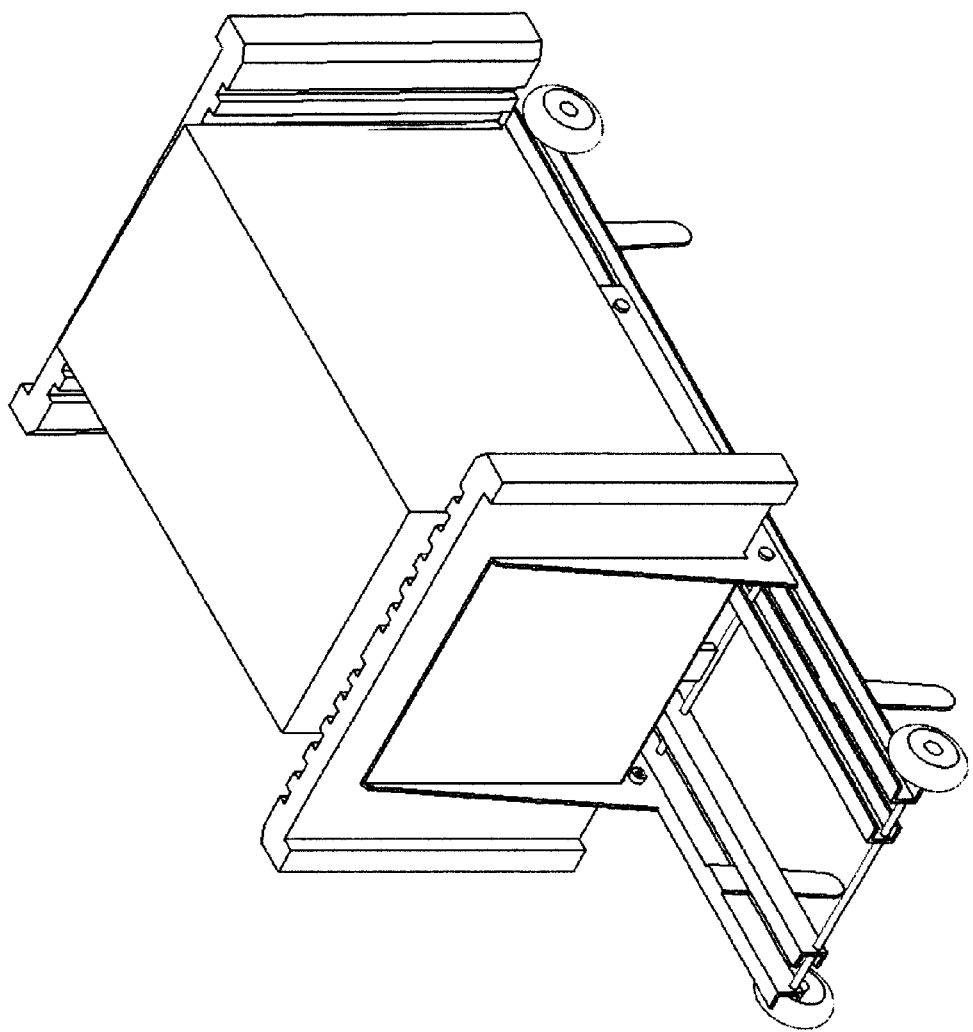
FIG. 4 is a perspective view showing the paper turner after the paper stack has been moved to an opposite end of the paper turner.
Figure 5:
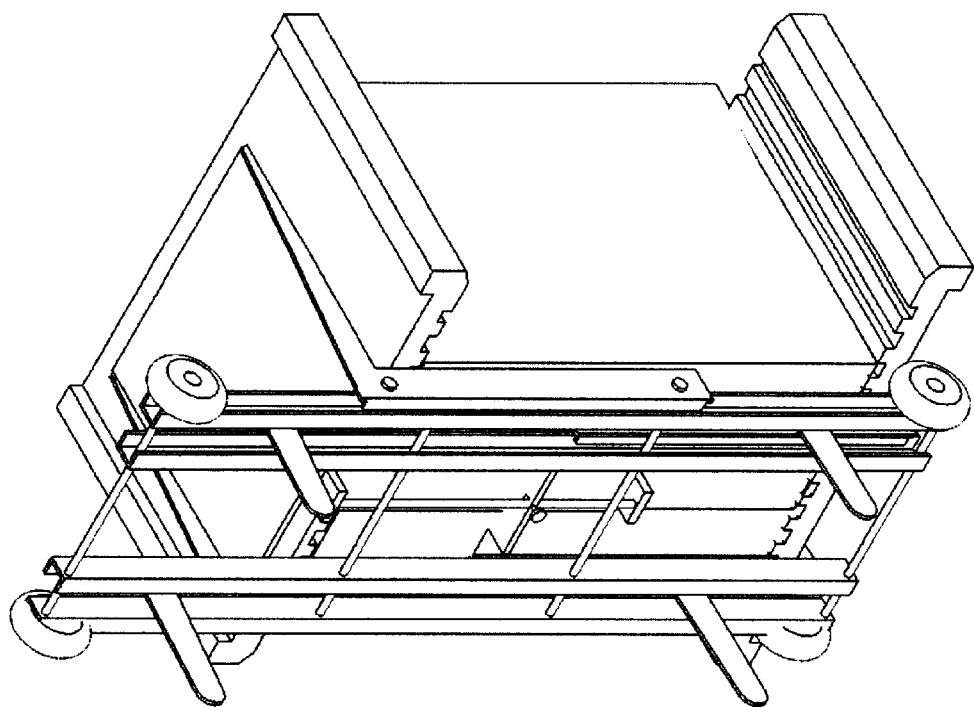
FIG. 5 is a perspective view showing the paper turner after the turner and the paper stack have been rotated to a vertical position 180° from the original position.
Figure 6:
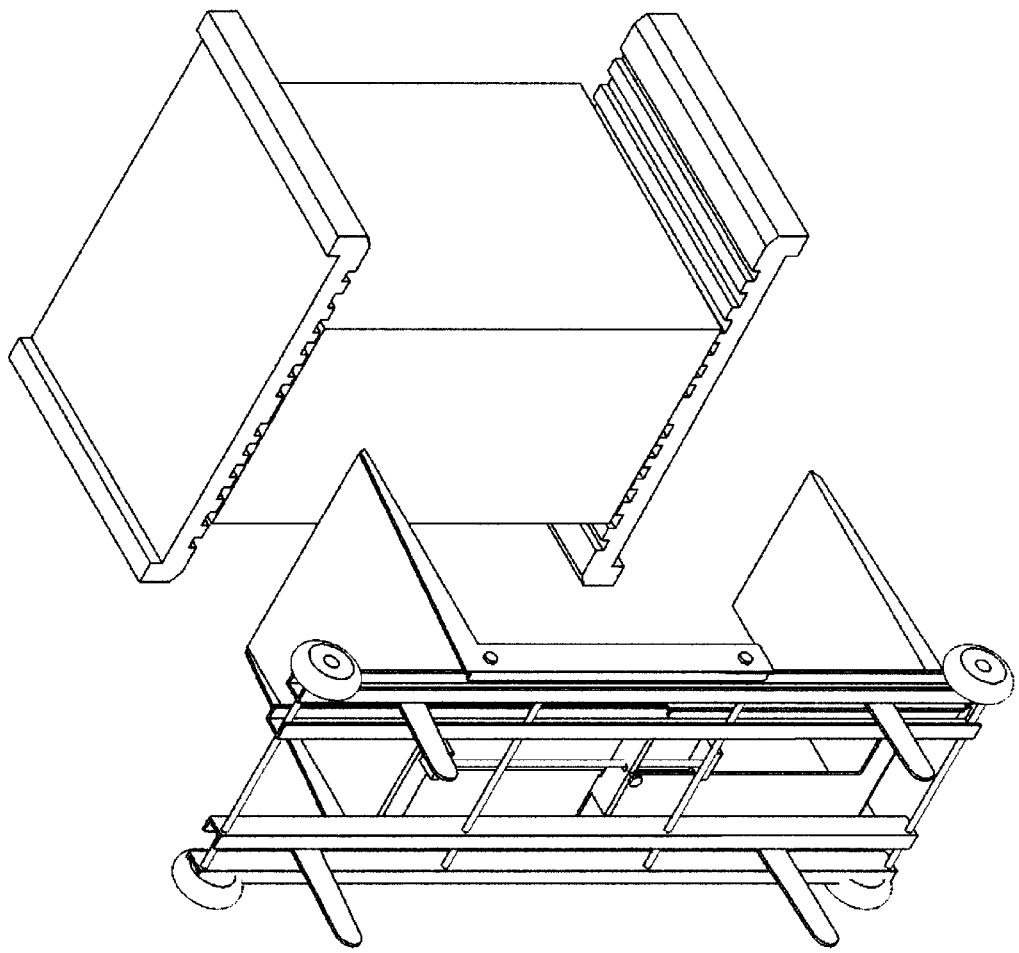
FIG. 6 is a perspective view of the paper turner after the turned paper stack is unloaded.

The operator then rotates the frame 16 of the turner 10 until the paper turner is in a horizontal position, as depicted in FIG. 3. The slide module 12 is then moved to the opposite end of the tracks 14, as shown in FIG. 4. The operator is then ready to continue to rotate the paper turner 10 until it is again in a vertical position, rotated 180° from its original position. The paper stack 18 is turned upside down, with the printed sides of the paper facing downward. The paper stack 18 is then ready to be fed into the printing press to complete the two-sided printing operation.

MOTOR DRIVEN VERSION OF THE PAPER TURNER OF THE PRESENT INVENTION

Figure 8:
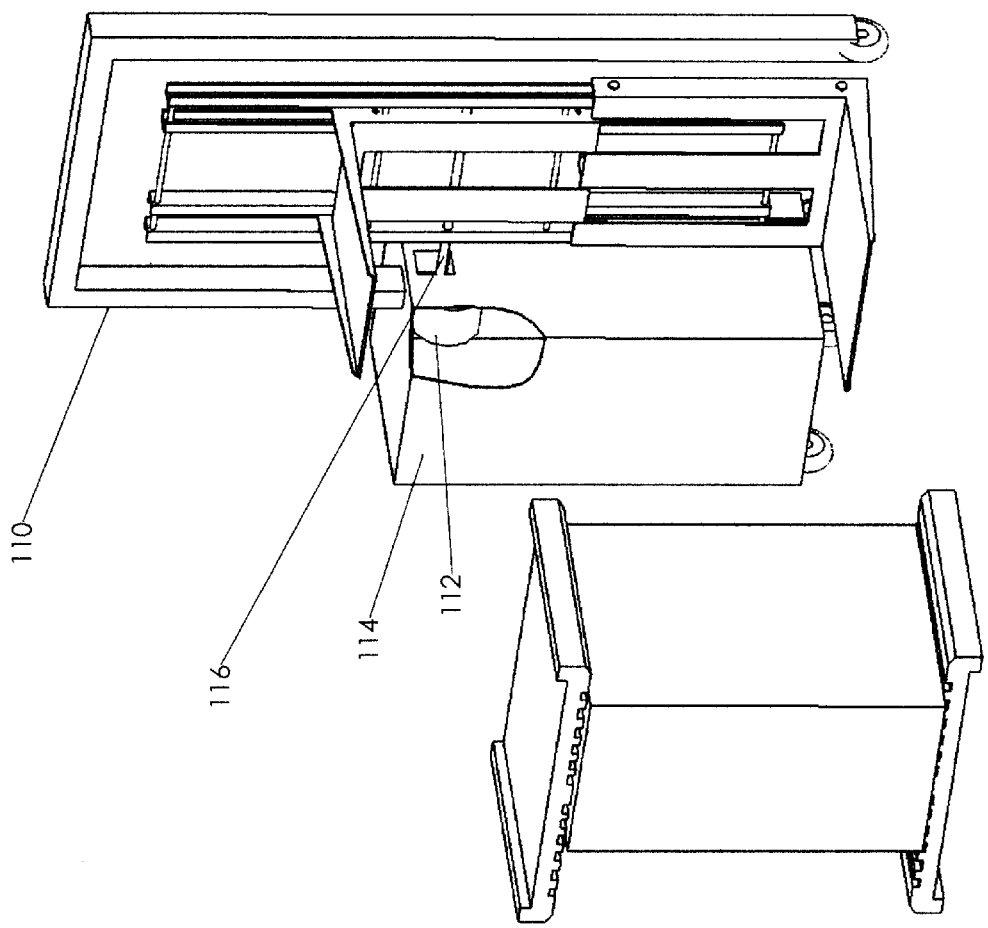
FIG. 8 is a perspective view of a powered embodiment of the paper turner.

FIG. 8 shows a motor driven version of the paper turner of the present invention that is intended to be used for heavier loads. The motor driven paper turner 110 has a motor 112 housed in a cabinet 114. The motor 112 drives a rotation shaft 116 that is affixed to a frame of the paper turner 110. When the motor 112 is activated by the user, the motor 112 drives the rotation shaft 116, and the paper turner 110 is rotated.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A load turning device comprising:
a slide module mounted on a track, and
a spacing mechanism; wherein
said slide module is installed on said track so that said slide module can move freely along said track, said slide module comprising a first slide and a second slide mounted on said track; such that
a first one of said slides is positioned underneath a load to be turned, and a second one of said slides is positioned on top of the load, said spacing mechanism being secured to hold said slides in position on top of and underneath the load,
said load turning device thereafter being rotated from an original vertical position to a position in which the load secured in said slide module is moved laterally from a first end of said load turning device to a second end of load turning device,
said load turning device thereafter being rotated again to a vertical position so that the load is in a position turned 180° from the original vertical position, rotation of said load being accomplished by the lateral movement of said slide module along said track.

2. The load turning device of claim 1 wherein:
said track comprises a pair of parallel rail sets, each said rail set comprising an inner rail and an outer rail.

3. The load turning device of claim 1 wherein:
said first slide comprises three first mounting bars, with a first clamping plate affixed at a distal end of said first mounting bars and extending at an approximately 90° angle outward from said first mounting bars,
said second slide comprises a pair of second mounting bars that nest within said first mounting bars of said first slide, and a second clamping plate is affixed at a distal end of said second mounting bars and extends at an approximately 90° angle outward from said second mounting bars.

4. The load turning device of claim 3 wherein:
said track comprises a pair of parallel rail sets, each said rail set comprising an inner rail and an outer rail, and
outermost ones of said first mounting bars include protruding elements, and said second mounting bars include protruding elements; such that
said protruding elements of said outermost ones of said first mounting bars engage said outer rails of said track, and said protruding elements of said second mounting bars engage said inner rails of said track.

5. The load turning device of claim 1 wherein:

said spacing mechanism comprises a lock screw mounted in a guide plate affixed to said second slide, said spacing mechanism further comprising a guide rod affixed to a center mounting bar of said first slide by means of mounting blocks, said guide rod passing through a through hole in said guide plate; wherein when said lock screw is loosened, said guide rod passes freely through said guide plate, and said first slide moves freely relative to said second slide, and when said lock screw is tightened, a position of said first slide relative to said second slide is fixed.

6. The load turning device of claim 1 wherein:

a first pair of wheels is mounted near a top end of said track, and a second pair of wheels is mounted near a lower end of said track.

7. The load turning device of claim 1 wherein:

a motor is used to drive a rotation shaft affixed to said track, said rotation shaft thereby rotating said load turning device.

* * * * *